(12) United States Patent
Choudhary et al.

(10) Patent No.: US 10,474,373 B2
(45) Date of Patent: Nov. 12, 2019

(54) PROVISIONING APPLICATIONS IN A HETEROGENEOUS VIRTUAL ENVIRONMENT

(71) Applicant: VMware, Inc., Palo Alto, CA (US)

(72) Inventors: Jairam Choudhary, Sunnyvale, CA (US); Matthew Conover, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 588 days.

(21) Appl. No.: 14/679,300

(22) Filed: Apr. 6, 2015

(65) Prior Publication Data

US 2015/0378624 A1  Dec. 31, 2015

Related U.S. Application Data

(60) Provisional application No. 62/019,282, filed on Jun. 30, 2014.

(51) Int. Cl.
| | |
|---|---|
| *G06F 3/06* | (2006.01) |
| *G06F 9/455* | (2018.01) |
| *G06F 8/61* | (2018.01) |
| *G06F 17/30* | (2006.01) |

(52) U.S. Cl.
CPC ............ *G06F 3/0619* (2013.01); *G06F 3/06* (2013.01); *G06F 3/0665* (2013.01); *G06F 3/0689* (2013.01); *G06F 8/61* (2013.01); *G06F 9/455* (2013.01); *G06F 9/45558* (2013.01); *G06F 17/30* (2013.01); *G06F 2009/45579* (2013.01)

(58) Field of Classification Search
CPC ............ G06F 9/45558; G06F 9/45533; G06F 2009/45562; G06F 2201/815; G06F 11/1469; G06F 11/1484; G06F 17/30233; G06F 17/30581; G06F 3/065; G06F 11/2094; G06F 2009/45583; G06F 8/61; G06F 9/5077; G06F 3/067; G06F 11/1458; G06F 17/30; G06F 2009/45579; G06F 3/0619; G06F 3/0665; G06F 3/0689

See application file for complete search history.

(56) References Cited

U.S. PATENT DOCUMENTS

| | | | | |
|---|---|---|---|---|
| 8,453,145 | B1 * | 5/2013 | Naik | .................. G06F 9/45558 718/1 |
| 8,566,297 | B1 * | 10/2013 | Dowers, II | ........ G06F 17/30073 707/703 |
| 8,578,076 | B2 * | 11/2013 | van der Linden | .... G06F 9/5077 709/227 |

(Continued)

*Primary Examiner* — Yaima Rigol

(57) ABSTRACT

Systems, methods, and software described herein provision application volumes for a plurality of virtual machines. In one example, a method of provisioning volumes for attachment to virtual machines includes provisioning an application in a virtual volume of a first virtual drive format, and identifying one or more alternative virtual drive formats for the application. The method further includes duplicating the application in the virtual volume to one or more additional virtual volumes corresponding to the one or more alternative virtual drive formats. The method also includes storing the virtual volume and the one or more additional virtual volumes in separate storage repositories, wherein each of the storage repositories is associated with one or more virtual machines and a particular virtual drive format.

20 Claims, 8 Drawing Sheets

(56) References Cited

U.S. PATENT DOCUMENTS

| | | | | |
|---|---|---|---|---|
| 8,943,105 B1* | 1/2015 | Bushman | ............ | G06F 9/45558 |
| | | | | 707/804 |
| 2010/0011014 A1* | 1/2010 | Odulinski | ............. | G06F 16/258 |
| | | | | 707/E17.006 |
| 2013/0047160 A1* | 2/2013 | Conover | ................... | G06F 8/65 |
| | | | | 718/1 |
| 2015/0058837 A1* | 2/2015 | Govindankutty | ... | G06F 9/45533 |
| | | | | 718/1 |

* cited by examiner

US 10,474,373 B2

PROVISIONING APPLICATIONS IN A HETEROGENEOUS VIRTUAL ENVIRONMENT

RELATED APPLICATIONS

This application is related to and claims priority to U.S. Provisional Patent Application No. 62/019,282, entitled "PROVISIONING APPLICATIONS IN A HETEROGENEOUS VIRTUAL ENVIRONMENT," filed on Jun. 30, 2014, and which is hereby incorporated by reference in its entirety.

TECHNICAL FIELD

Aspects of the disclosure are related to the provisioning of applications for virtual machines, and in particular to managing the provisioning of applications for multiple virtual environments.

TECHNICAL BACKGROUND

Virtualization techniques have gained popularity and are now commonplace in data centers and other environments in which it is useful to increase the efficiency with which computing resources are used. In a virtualized environment, one or more virtual machines are instantiated on an underlying computer, or host, and share the resources of the underlying computer. To provide the resources necessary for each of the virtual machines, a hypervisor may execute on top of the host to abstract the physical components of the underlying computer and provide virtual components to the virtual machine. In some implementations, the hypervisor may be implemented at a layer above the host operating system, while in other implementations the hypervisor may be integrated with the host's operating system.

In some virtualization environments, various virtual hard disks (VHDs), virtual machine disks (VMDKs), virtual disk images (VDIs), or other virtualized volumes may be attached or mounted to the virtual machines. These virtualized volumes may contain files, such as pictures, videos, music, and the like, but may further include applications that are capable of execution using the allocated virtual machine resources. However, the virtualized volumes may be specific to a hypervisor provider, preventing volumes from being attached to virtual machines using alternative hypervisor providers.

OVERVIEW

Provided herein are enhancements for provisioning application volumes for virtual machines. In one example, an apparatus to provision application volumes for attachment to virtual machines includes one or more non-transitory computer readable media. The apparatus further includes processing instructions stored on the one or more non-transitory computer readable media that direct processing circuitry to provision an application in a virtual volume of a first virtual drive format, and identify one or more alternative virtual drive formats for the application. The processing instructions further direct the processing circuitry to duplicate the application in the virtual volume to one or more additional virtual volumes corresponding to the one or more alternative virtual drive formats, and store the virtual volume and the one or more additional virtual volumes in separate storage repositories, wherein each of the storage repositories is associated with one or more virtual machines and a particular virtual drive format.

In another example, a method of provisioning volumes for attachment to virtual machines includes provisioning an application in a virtual volume of a first virtual drive format, and identifying one or more alternative virtual drive formats for the application. The method further includes duplicating the application in the virtual volume to one or more additional virtual volumes corresponding to the one or more alternative virtual drive formats. The method also includes storing the virtual volume and the one or more additional virtual volumes in separate storage repositories, wherein each of the storage repositories is associated with one or more virtual machines and a particular virtual drive format.

In a further instance, a system to provision application volumes for attachment to virtual machines includes a plurality of storage repositories. The system further includes a provisioning manager configured to provision an application in a virtual volume of a first virtual drive format, and identify one or more alternative virtual drive formats for the application. The provisioning manager is further configured to duplicate the application in the virtual volume to one or more additional volumes corresponding to the one or more alternative virtual drive formats, and store the virtual volume and each of the one or more additional virtual volumes separately in the plurality of storage repositories, wherein each storage repository in the plurality of storage repositories is associated with one or more virtual machines and a particular virtual drive format.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
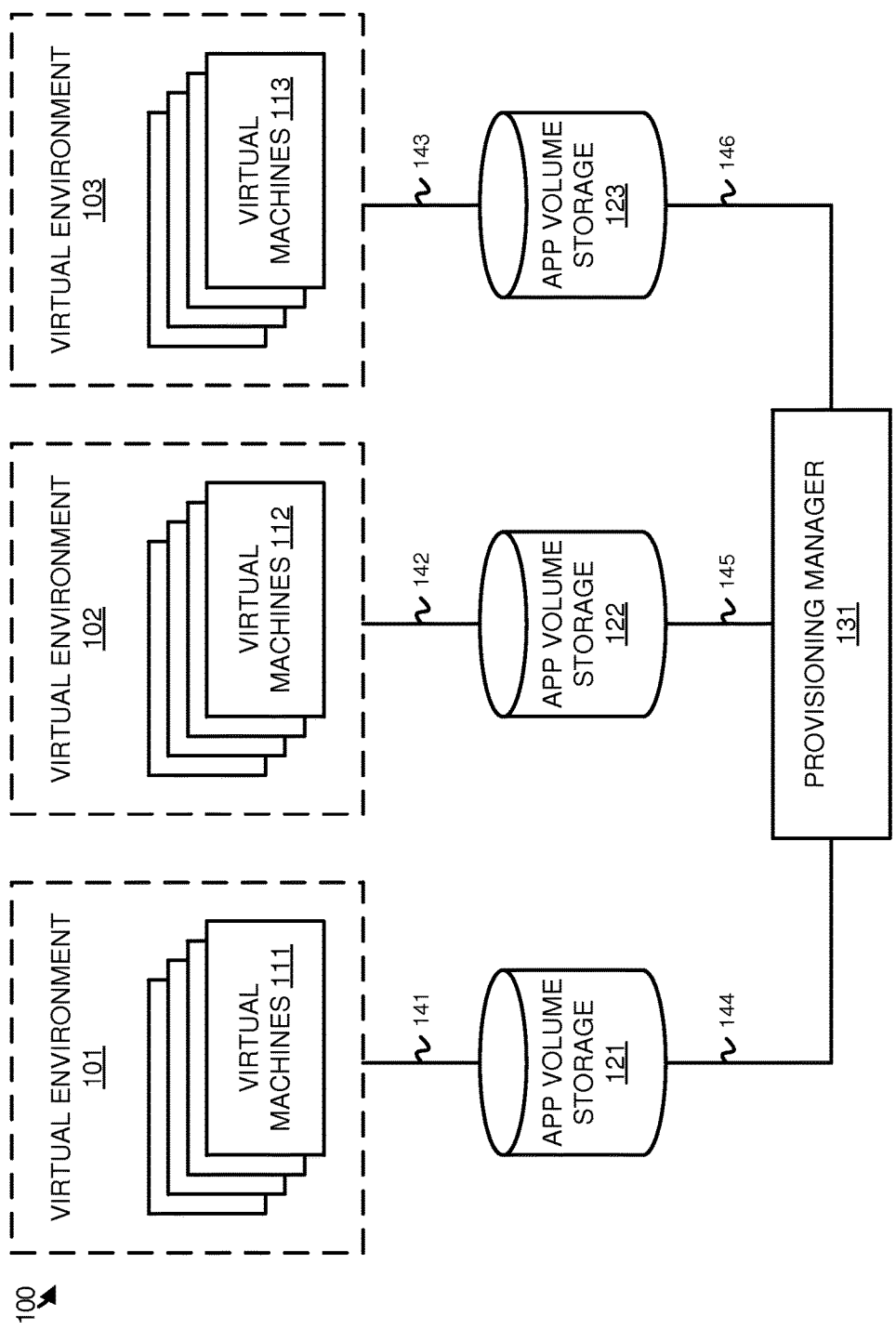
FIG. 1 illustrates a computing environment to provision applications into virtual volumes.

Virtual machines provide an efficient way of maximizing the use of resources on host computing systems. To accomplish this task, one or more hypervisors executing on a host computing system, abstract the physical components of the host computing system, and provide the components to one or more virtual machines. These virtual machines may operate as a standalone-computing device with an operating system and applications to perform specific tasks, but share the physical resources of the underlying host.

In the present example, a plurality of virtual machines may be initiated that each requires varying virtual drive formats. For example, a first group of virtual machines may require virtual hard disk (VHD) format for attached volumes, whereas a second group of virtual machines may require virtual machine disk format (VMDK) for attached volumes. Accordingly, a management system that provides volumes to each group of virtual machines may need to create separate virtual volumes that contain the same data.

In some instances, the attachable volumes for the virtual machines may include applications that become executable upon attachment. For example, a user of a virtual machine may require an image editing application to edit pictures via the virtual machine. Rather than searching for and installing the appropriate application, a volume that has an image editing application provisioned thereon may be mounted to the virtual machine, and through registry edits, and pointer modifications, the application may be made available on the virtual machine without requiring the user to execute a traditional installation process. For example, to mount the volume, the virtual machine may be provided with a mount point or access path for the volume. Once the access path is provided and the volume is made available to the virtual machine, registry keys, that may be stored in the mounted volume, may be added in the virtual machine to access the executable files from the attached volume. In some implementations, in addition to adding the registry keys, pointers to the executable files in the attached volume may be overlaid in the file system of the virtual machine to make the application appear as though it had been locally installed. For example, in a Microsoft virtual machine, pointers for the attached application files may be added within the C: drive of the virtual machine.

To generate the application volumes, a provisioning manager may be used to generate volumes for the variety of formats required by the virtual machines. This provisioning manager may provision the application into a virtual volume with a first format, identify one or more alternative formats for the application, and duplicate the application files, directories, and other necessary elements from the virtual volume to additional volumes corresponding to the alternative formats. Once the volumes are generated, the provisioning manager may store the various volumes to locations accessible by one or more virtual machines. Thus, when the volumes are provisioned, virtual machines that require different virtual volume formats may have access to the same application.

In some examples, an organization may initiate a plurality of virtual machines across a plurality of hosts as part of a service. This service may allocate the virtual machines to one or more users, allowing the users to access particular applications that suit the users' preferences and requirements. To access the one or more virtual machines, remote computing devices, such as desktop computers, laptop computers, smart phones, tablets, and the like, may remotely login or access the virtual machines using the internet or other similar communication networks. Once accessed, the user of the remote device may execute various attachable applications via the virtual machine. However, to provide the applications to each virtual machine that is part of the service, different types of virtual drives may be required for the various types of hypervisors that are supporting the virtual machines. Accordingly, a provisioning manager may be used to generate application volumes in each of the necessary virtual drive formats.

Turning to FIG. 1, FIG. 1 illustrates a computing environment 100 to provision applications in virtual volumes. Computing environment 100 includes virtual environments 101-103, application volume storage or repositories 121-123, and provisioning manager 131. Virtual environments 101-103 further include host computing systems, operating systems, and hypervisors capable of executing virtual machines 111-113. Virtual environments 101-103 communicate with application volume storage elements 121-123 over communication links 141-143. Application volume storage elements 121-123 further communicate with provisioning manager 131 over communication links 144-146. Although illustrated outside of virtual environments 101-103, it should be understood that provisioning manager 131 might reside in any of virtual environments 101-103.

In operation, virtual machines 111-113 execute on top of one or more hypervisors that abstract the components of host computing devices and provide the elements to the virtual machines. Virtual environments 101-103 may, in some examples, execute the virtual machines using different platforms or hypervisors that require specific virtual drive formats. For example, the virtual volumes that are required for virtual environment 101 may be of a different format than the virtual volumes that are required for virtual environments 102-103. Accordingly, any data that needs to be presented to the virtual machines may need to be duplicated across the storage volumes attachable to the virtual machines.

As depicted in FIG. 1, application volumes are made available to virtual machines 111-113 via application volume storage 121-123. Applications volume storage 121-123 stores one or more volumes that contain one or more applications, which are attachable to the virtual machines. These application volumes include all of the files, directories, and other necessary elements to execute the application on the virtual machine without traditional installation. For example, a user of a virtual machine in virtual environment 101 may require a word processing application. Rather than locating and installing the application for execution, a word processing application volume from application volume storage 121 may be identified and mounted to the appropriate virtual machine. Once the volume is mounted, registry keys, pointers, and other files may be updated to make the application available to the user without executing the application installer. For example, to mount a desired volume, the virtual machine may be provided with a mount point or access path for the volume. Once the access path is provided and the volume is made available to the virtual machine, registry keys, that may be stored in the mounted volume, may be added in the virtual machine to access the executable files from the attached volume.

To load the applications within application volume storage elements 121-123, provisioning manager 131 is provided. Provisioning manager 131 may comprise a real or virtual computing element capable of provisioning application volumes based on settings configured by an administrator or some other management processes. For instance, an administrator may prefer to make a word processing application available to virtual machines 111-113. Accordingly, the administrator may find the appropriate installer for the application and provision a first virtual volume to contain the necessary elements of the application. Once the application is captured for the first virtual volume, the application may then be duplicated and provisioned in other volumes of differing drive formats.

Figure 2:
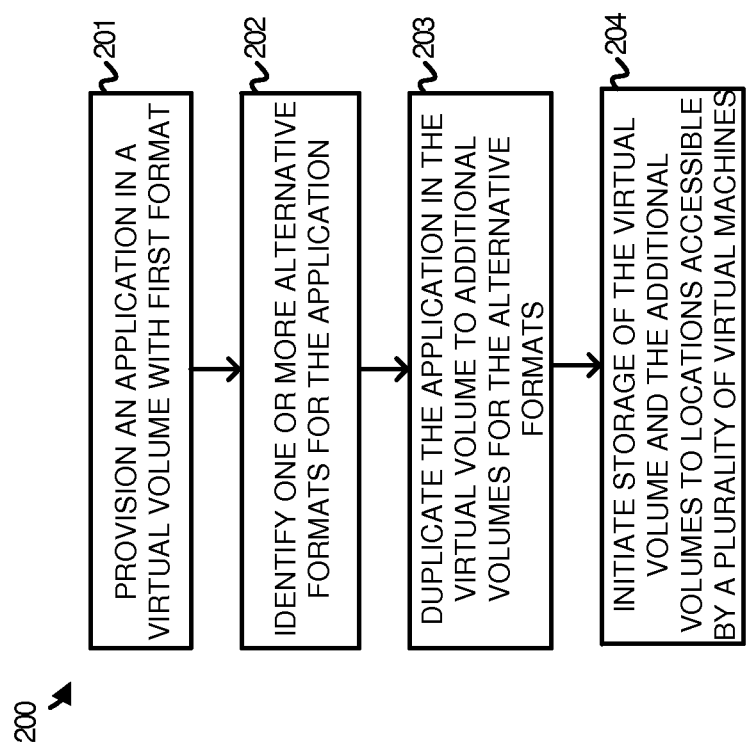
FIG. 2 illustrates a method of provisioning applications into virtual volumes.

As a further illustration of the provisioning of virtual volumes, FIG. 2 is included. FIG. 2 illustrates a method of provisioning applications into virtual volumes. As depicted, the method includes provisioning an application in a virtual volume of a first virtual drive format (201). This application may include a word processing application, a file sharing application, an image editing application, or any other similar application. The method further provides, identifying one or more alternative virtual drive formats for the application (202). As discussed above, virtual machines may execute on a variety of platforms that require specific virtual drive formats. Accordingly, an application stored in a volume of one format may not be able to execute on virtual machines incapable of processing that format. Thus, the method further provides duplicating the application in the virtual volume to one or more additional virtual volumes corresponding to the one or more alternative virtual drive formats (203). As the drives are provisioned, the method includes initiating storage of the virtual volume and the one or more additional virtual volumes to locations accessible by a plurality of virtual machines (204).

Returning to FIG. 1 as an example, an administrator or some other management service may desire to make an application available across virtual environments 101-103. To make the application available, provisioning manager 131 may provision a first virtual volume of first format to be stored in application storage 121 and provided to virtual environment 101. Before, during, or after the provisioning, provisioning manager 131 may identify one or more alternative drive formats for the application that can be stored in application volume storage 122-123 and provided to virtual environments 102-103. As a result, provisioning manager 131 may duplicate the files and other necessary elements for the application from the first virtual volume to additional virtual volumes. Once application volumes are generated, provisioning manager 131 may initiate storage of the application volumes in application volume storage elements 121-123 to give virtual machines access to the application. In some examples, virtual environments 101-103 each correspond to a different hypervisor type. As a result, rather than provisioning a single volume that can be attached by all of the virtual machines, separate volumes may need to be generated that correspond to each of the hypervisor types. These hypervisors may include VMware ESX, Xen, Microsoft Hyper-V, or some other type of hypervisor.

Figure 3:
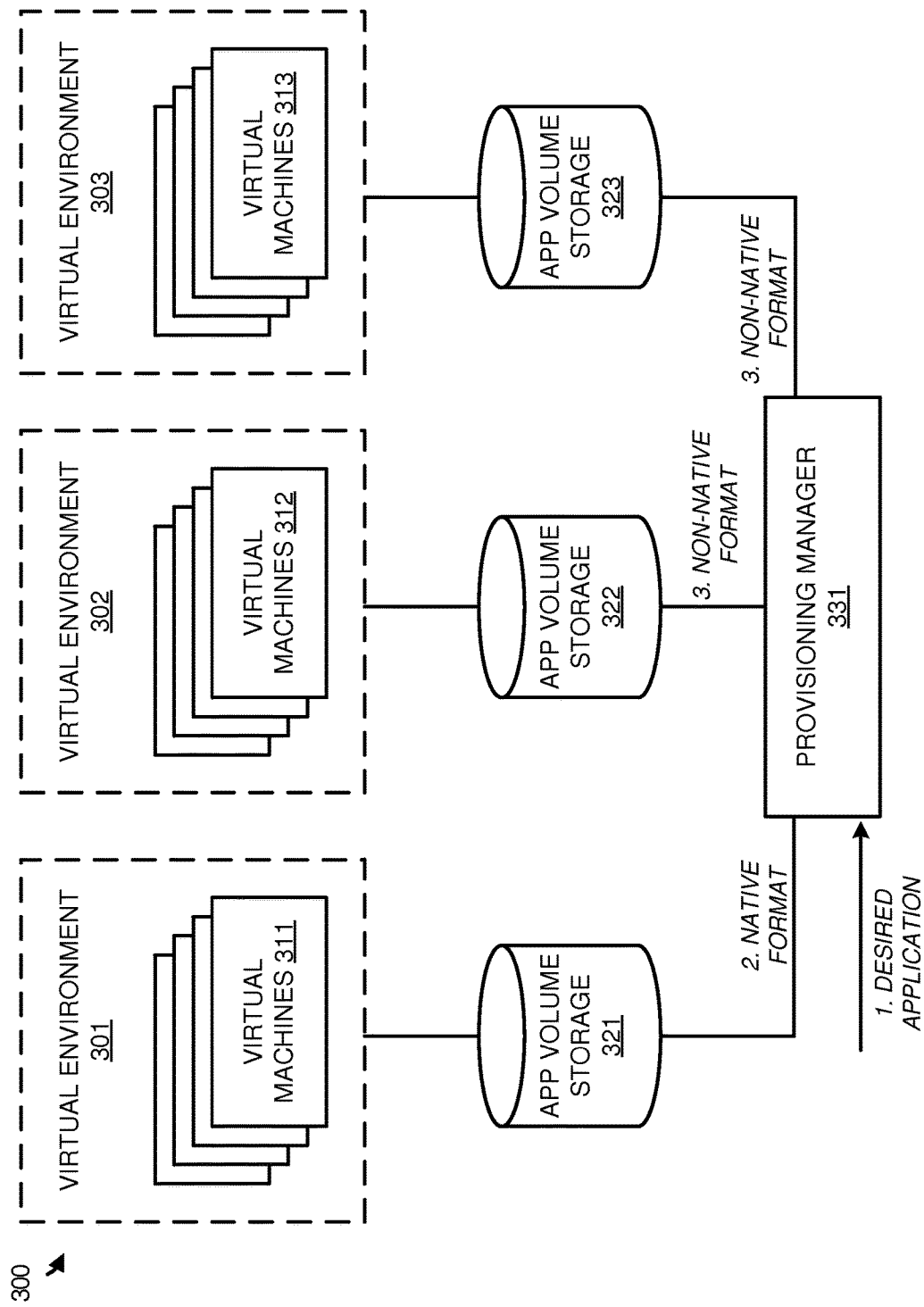
FIG. 3 illustrates an overview of provisioning applications into virtual volumes.

Turning to FIG. 3, FIG. 3 illustrates an overview 300 of provisioning applications into virtual environments. Overview 300 includes virtual environment 301-303, application storage elements 321-323, and provisioning manager 331. Virtual environments 301-303 include one or more host computing devices that, with the assistance of hypervisors, execute a plurality of virtual machines 311-313. As illustrated in FIG. 3, each virtual environment in virtual environments 301-303 requires a particular drive format for volumes to be attached to the virtual machines. These drive formats may include VMDK format, VHD format, virtual disk image (VDI) format, or some other similar drive format. Accordingly, separate application volume storage elements 321-323 are used to separate and provide the necessary applications in the proper format to the various virtual environments.

To provision the virtual volumes for the applications, provisioning manager 331 is provided. Provisioning manager 331 identifies an application to be provisioned and initially provisions a storage volume in a native format for the application. For example, provisioning manager 331 may comprise a virtual machine that includes a native platform for generating new virtual volumes. Accordingly, when an application requires provisioning, a native volume is generated that may comprise a VHD, a VMDK, a VDI, or any other similar volume for the application. Before, during, or after the provisioning of the native volume, an administrator or management service may define alternative volume formats for the application that can be used to service other virtual environments. Accordingly, once the volume formats are identified, provisioning manager 331 provisions volumes in accordance with the specified formats. In turn, the application that was installed or provisioned within the native format volume, will be duplicated into the non-native format volumes.

As illustrated in FIG. 3, the native format volume is provided to application volume storage 321, whereas the non-native format volumes are provided to application volume storage 322-323, respectively. By providing the formatted volumes to different storage locations, virtual machines that expect different volume formats may attach and execute the application. For example, virtual machines 311 may expect VHD volumes for attached storage elements, whereas virtual machines 312 may expect VMDK volumes for attached storage elements. Thus, although provisioning manager 331 may provision the application originally in a VHD volume, the necessary elements for the application may be duplicated into a VMDK volume for other virtual machines.

Figure 4:
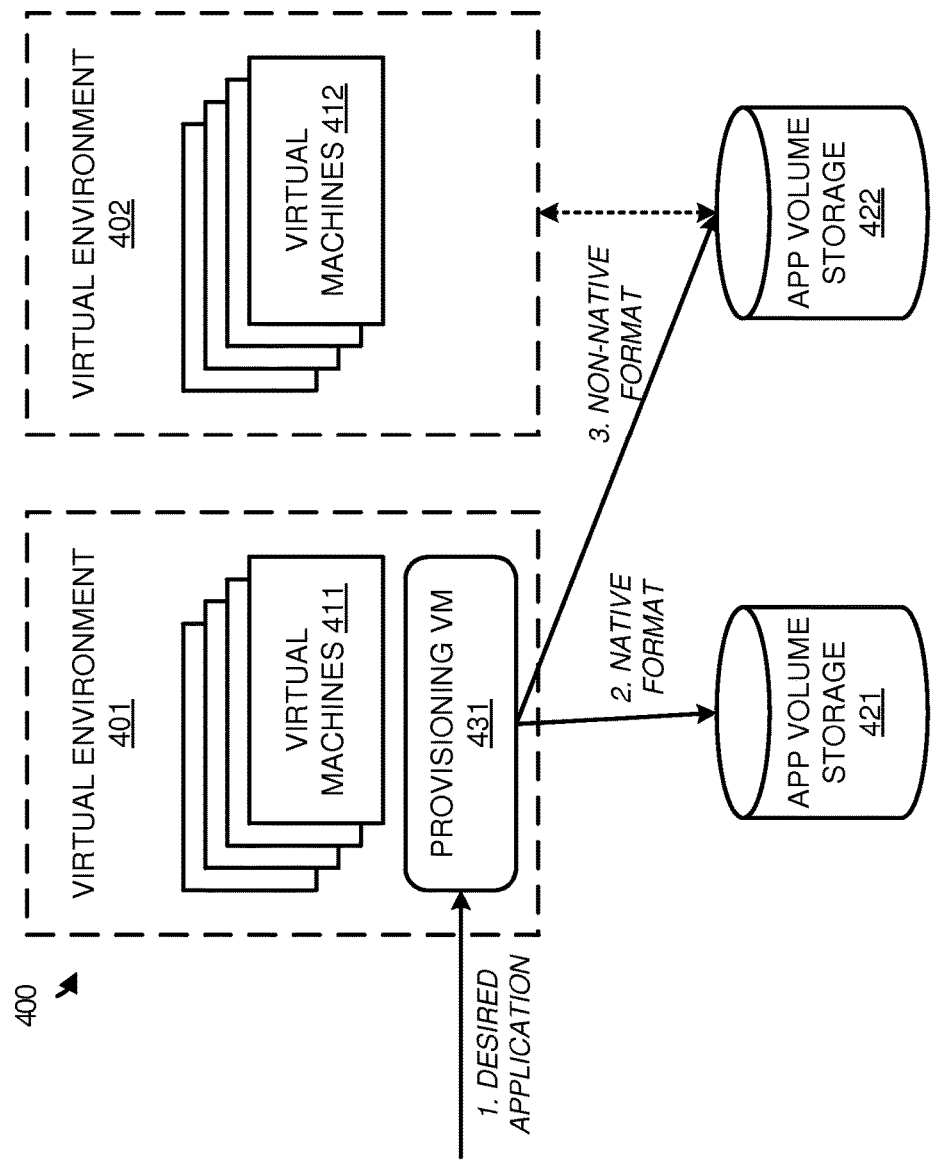
FIG. 4 illustrates an overview of provisioning applications into virtual volumes.

Turning to FIG. 4 as another example of provisioning application volumes for multiple virtual machines. FIG. 4 illustrates an overview 400 of provisioning applications into virtual volumes. Overview 400 includes virtual environments 401-402, application storage elements 421-422, and provisioning virtual machine (VM) 431. Virtual environments 401-403 include one or more host computing devices that, with the assistance of hypervisors, execute a plurality of virtual machines 411-412. As illustrated in FIG. 4, each virtual environment in virtual environments 401-402 requires a separate virtual drive format for volumes to be attached to the virtual machine. Accordingly, separate application volume storage elements 421-422 are used to separate and provide the necessary applications to the various virtual environments.

Similar to the operation described in FIG. 3, a provisioning manager, in this example provisioning virtual machine 431, is used to provision the necessary application volumes for the virtual machines. Accordingly, when a new application needs to be placed in attachable application volumes, provisioning virtual machine 431 identifies the application and initiates provisioning or installation of the application using a native format for the provisioning virtual machine.

In addition to provisioning the application in a native volume format, provisioning virtual machine 431 may also identify one or more additional volume formats for the application, as well as one or more storage locations to place the completed application volumes. As depicted in FIG. 4, provisioning virtual machine 431 provisions a first native volume for the application that can be stored in application volume storage 421, and accessed by virtual machines 411. Further, provisioning virtual machine 431 provisions a second non-native volume for the application that can be stored in application volume storage 422, and accessed by virtual machines 412. To store the proper application elements within the non-native storage volume, provisioning virtual machine 431 duplicates the necessary application elements that are stored in the native volume to the non-native volume. Thus, after provisioning the first native volume with the installed application, any further volumes that use alternative volume versions may be created by copying the files, directories, and other elements for the application to the alternative volume versions. By generating multiple attachable volume versions for the application, multiple virtual machine platforms may access the application without provisioning the application separately.

Figure 5:
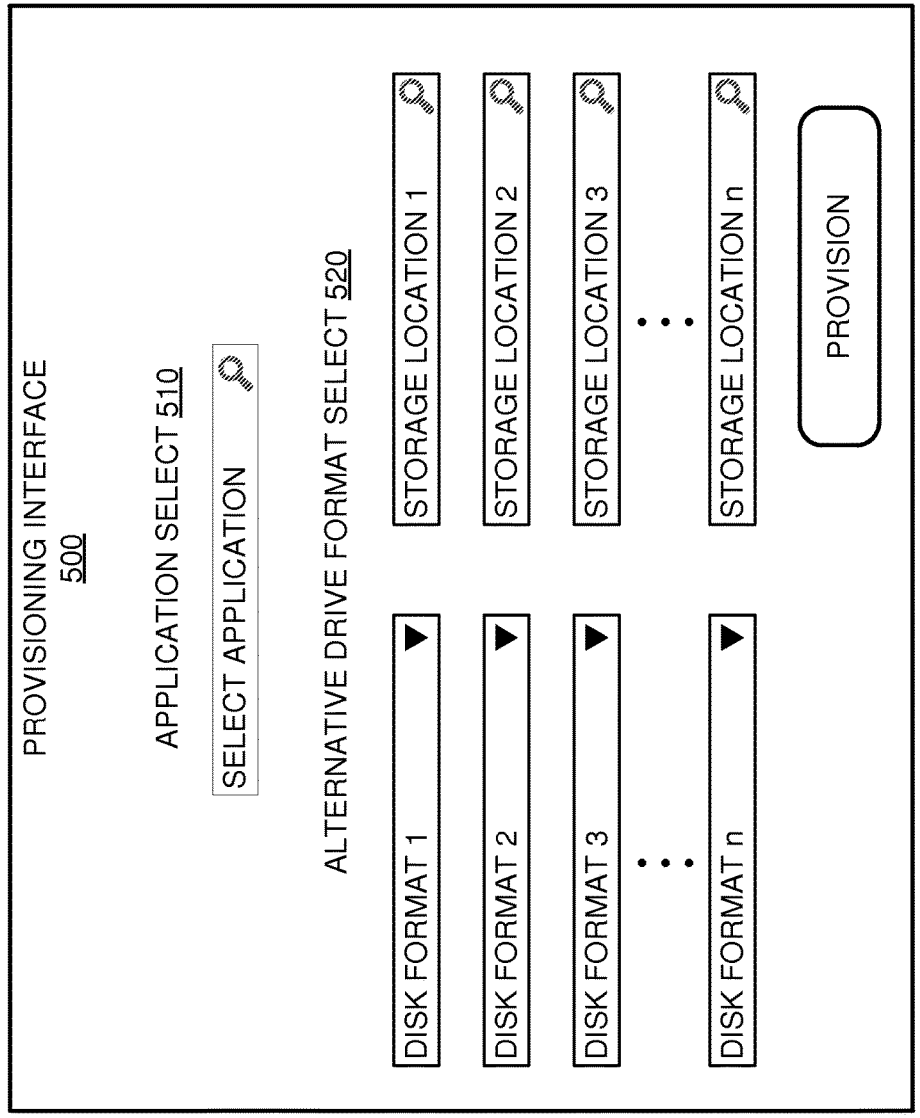
FIG. 5 illustrates a provisioning interface to provision virtual volumes with attachable applications.

Turning now to FIG. 5, FIG. 5 illustrates a provisioning interface 500 to provision virtual volumes with attachable applications. Provisioning interface 500 is an example user interface that allows an administrator of one or more virtual environments to provision virtual volumes with attachable applications. Provisioning interface 500 includes application select 510 and alternative drive format select 520.

As discussed in FIGS. 1-4, an administrator may identify an application to be provisioned or installed in virtual volumes for one or more virtual environments. Once provisioned, users and virtual machines within the virtual environments may select the application, and the application may be attached to the virtual machine to make the application executable, without using a local installer for each virtual machine. In the present example, to initiate the provisioning of the virtual machines, provisioning interface 500 is presented to an administrator of the one or more virtual environments. This interface allows the user to select the application that they wish to have provisioned or installed into a particular virtual volume, as well as the alternative drive formats the application. For example, a user may specify that they desire an image editing software application to be provisioned using application select 510. Accordingly, the image editing software will be provisioned and made available within a native volume that can be accessed by virtual machines that require the same native format. Further, the user may select one or more alternative drive formats using alternative drive format select 520, as well as locations to store the alternative drive formats. Thus, when the user selects to provision the application, the application will first be provisioned into the native format and then may be duplicated into requested volumes of non-native drive format.

Although not illustrated in the present example, it should be understood that the user might identify other preferences for a native format, such as the storage location for the native format, or other similar settings. Further, it should be understood that although drive formats and storage locations are illustrated in the present example, other settings and configurations might be presented to the administrator to generate the appropriate volume or volumes for the application.

Figure 6:
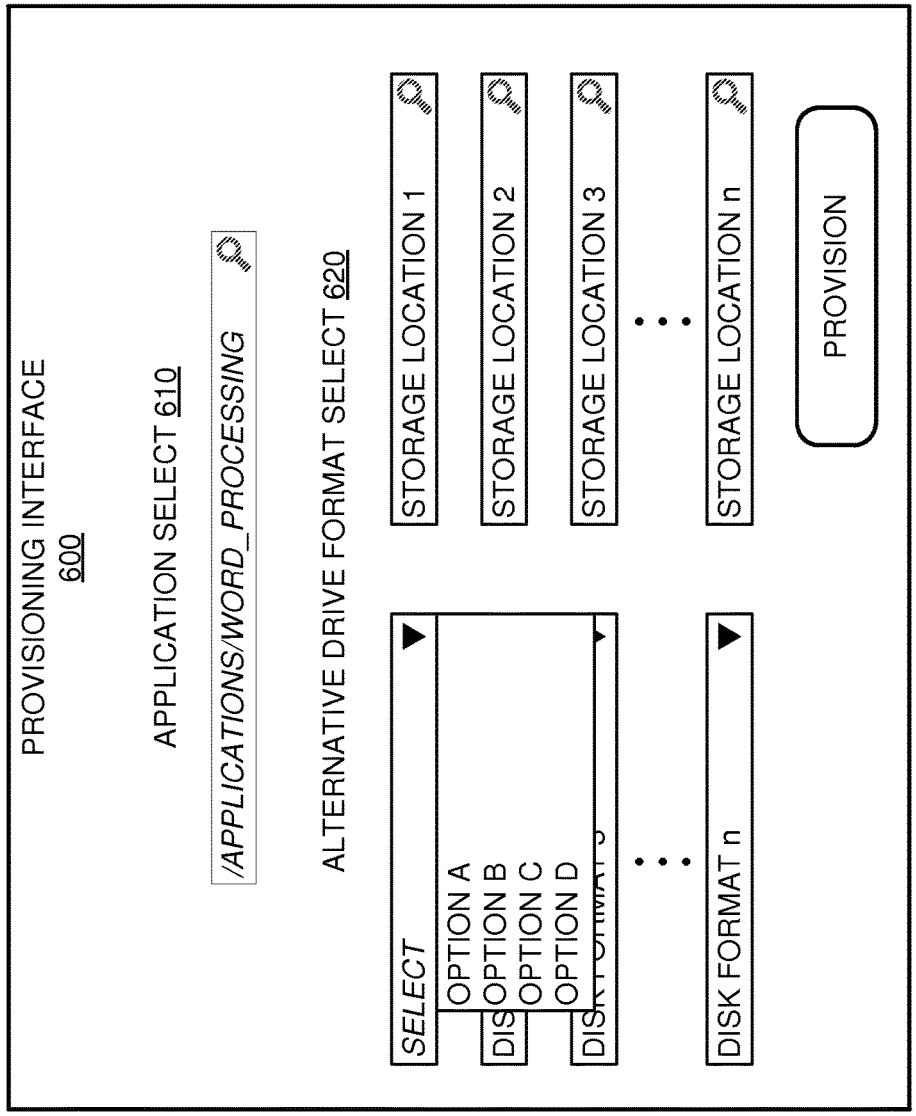
FIG. 6 illustrates a provisioning interface to provision virtual volumes with attachable applications.

Turning to FIG. 6, FIG. 6 illustrates a provisioning interface 600 to provision virtual volumes with attachable applications. Provisioning interface 600 includes application select 610 and alternative drive format select 620. Similar to the operation described in FIG. 5, provisioning interface 600 allows an administrator to select an application to be provisioned into one or more virtual volumes. Here, the administrator has selected a word processing application from a file path selectable from a search mechanism in application select 610. Once selected, the word processing application will be provisioned into a native volume, and will also be provisioned into non-native volumes selectable by the administrator. As illustrated in FIG. 6, alternative drive format select 620 includes drop down menus that allow the administrator to select alternative formats from available selections. Once all of the formats are selected, and destination locations are determined for the volumes, the application may be provisioned into the various drive formats. Although illustrated in the present example with drop down menus and searchable boxes, it should be understood that this is merely illustrative and the user interface may include any other mechanism that allows the administrator to select applications, volume formats, and locations for the volumes.

Figure 7:
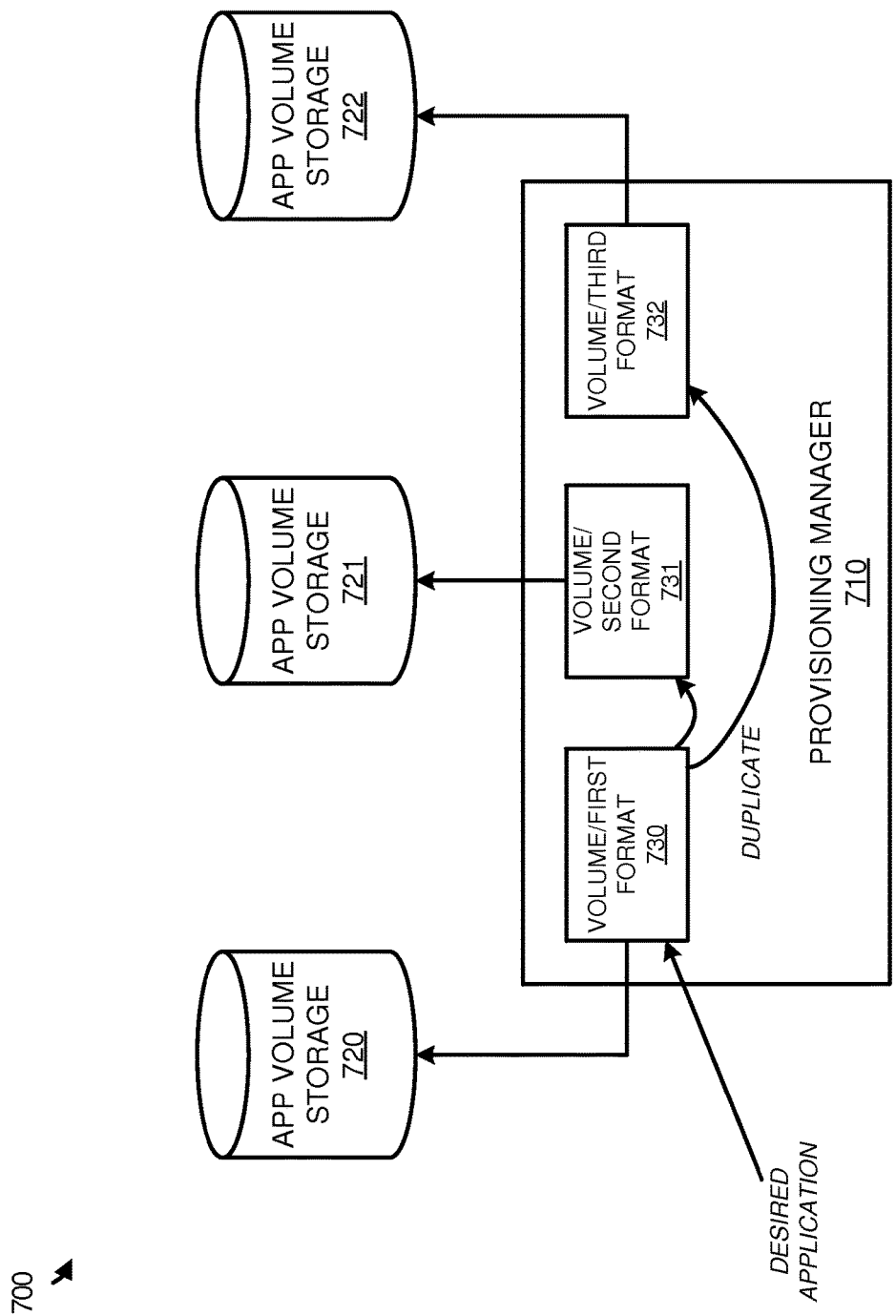
FIG. 7 illustrates an overview of duplicating an application across multiple virtual drive formats.

FIG. 7 illustrates an overview 700 of duplicating an application across multiple virtual drive formats. Overview 700 includes provisioning manager 710, application volumes storage or repositories 720-722, and application volumes 730-732. As described herein, a user, an administrator, or some other automated process may define a desired application to be provisioned for a plurality of virtual machines. Upon specifying the application, the application may be provisioned or installed within volume 730 with a first drive format, which may in some examples correspond to a native format for provisioning manager 710. This format may include VMDK format, VHD format, VDI format, or any other type of format.

In addition to provisioning the application in the first format, the user, the administrator, or an automated process may define one or more additional virtual drive formats that are required for the virtual environment. Once the additional virtual drive formats are identified, the application in volume 730 is duplicated to volumes 731-732, which correspond to the additional drive formats. These drive formats may include VHD, VMDK, VDI, or some other similar format. In response to provisioning the various virtual volumes, provisioning manager 710 is then configured to initiate storage of the virtual volumes to application volume storage 720-722, wherein the volume storage is specific to the type of virtual drive format. For example, application volume storage 720 may be used to storage VMDKs, whereas application volume storage 721 may be used to store VHDs. Once the volumes are in the proper storage locations, a virtual machine that requires the application may mount the application volume in the necessary format for the virtual machine. Accordingly, rather than installing or provisioning an application in each drive format required for a virtual environment, the application may be provisioned once and duplicated to the necessary alternative formats.

Figure 8:
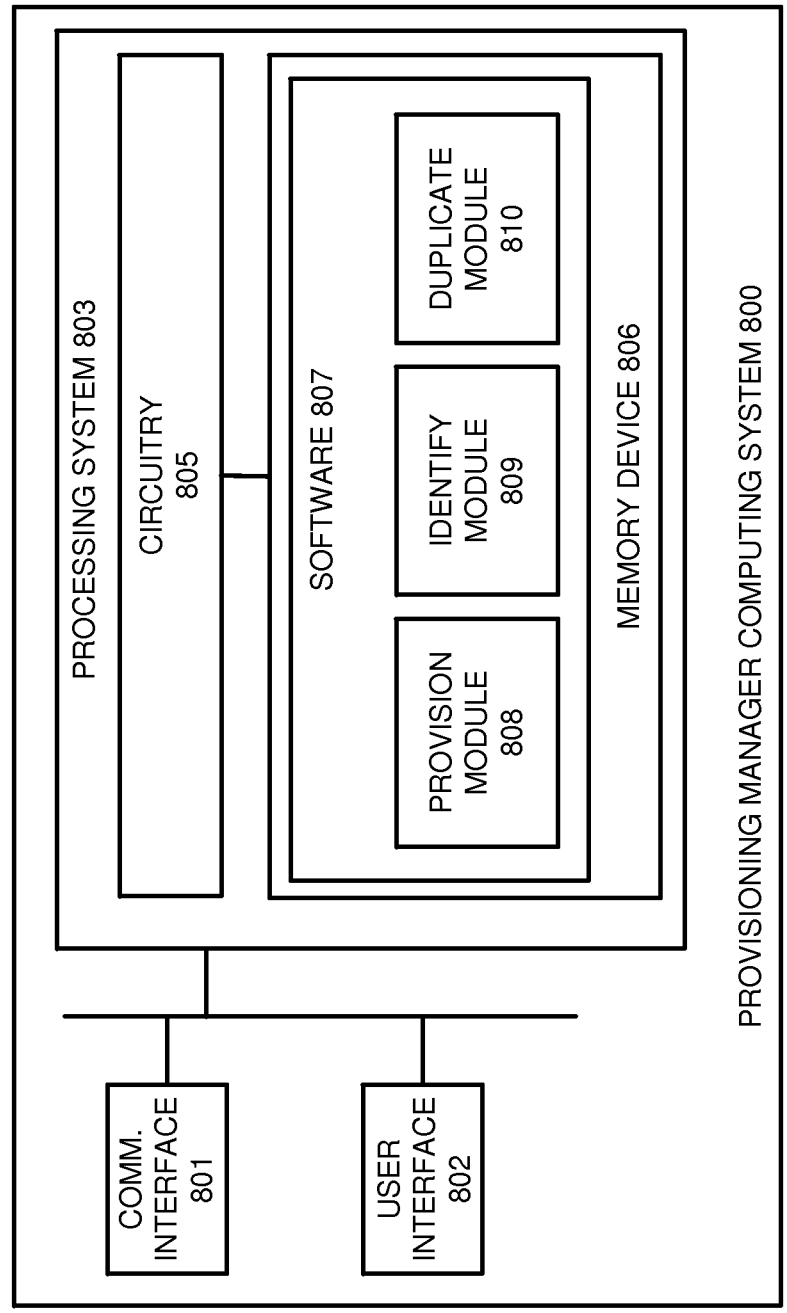
FIG. 8 illustrates a provisioning manager computing system to provision virtual volumes with applications.

FIG. 8 illustrates a provisioning manager computing system 800 to provision virtual volumes with applications. Provisioning manager computing system 800 is representative of a computing system that may be employed in any computing apparatus, system, or device, or collections thereof, to suitably implement the provisioning manager elements described in FIGS. 1-6. In some instances, provisioning manager computing system 800 may comprise a virtual computing system that executes on top of a host computing system. Computing system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof. Communication interface 801 may be configured, in some examples, to communicate with one or more application volumes storage locations or repositories that are available to attach application volumes to virtual machines.

User interface 802 comprises components that interact with a user. User interface 802 may include a keyboard, display screen, mouse, touch pad, or some other user input/output apparatus. User interface 802 may be configured in some examples to receive provisioning settings from an administrator of one or more virtual environments. These configuration settings may include an application to be provisioned, the types of drive formats for the provisioned virtual volumes, the location to store the virtual volumes, or any other similar setting for provisioning volumes for a virtual machine.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus, but in no case is the storage medium a propagated signal. Operating software 807 comprises computer programs, firmware, or some other form of machine-readable processing instructions. Operating software 807 includes provision module 808, identify module 809, and duplicate module 810. Although illustrated with three software modules in the present example, it should be understood that computing system 800 might include any number of software modules to carry out the operations described herein. Operating software 807 may further include an operating system, utilities, drivers, network interfaces, applications, or some other type of software. When executed by circuitry 805, operating software 807 directs processing system 803 to operate computing system 800 as described herein.

In particular, provision module 808 provisions an application in a virtual volume with a first format. In some examples, computing system 800 may be configured as a virtual machine. Accordingly, when the virtual machine attempts to generate a virtual volume for the application it may generate a virtual volume that is native to that virtual machine. In addition to provisioning the first volume, identify module 809 identifies one or more alternative formats for the application. These alternative formats allow virtual volumes to be attached to virtual machines that may not be able to recognize the virtual volume with the first format. Accordingly, once the one or more alternative formats for the application are identified, duplicate module 810 may duplicate the application in the virtual volume with the first format to additional volumes with alternative formats. For example, computing system 800 may initiate provisioning of a word processing application in VHD format, however, an administrator or some other management service may also prefer to generate a VMDK volume for the same application. Accordingly, once the word processing application is stored in VHD format, computing system 800 may duplicate the files and other necessary elements of the application into a VMDK volume to be attached to other virtual machines.

As the applications are provisioned into the appropriate volumes, the volumes are stored in storage locations or repositories that are accessible by a plurality of virtual machines. In some instances, these storage locations are specific to the volume format and virtual machine environment. For example, a computing environment may include a plurality of virtual machine environments that each requires a different virtual volume format for attachable applications. Accordingly, as the applications are provisioned, the appropriate formatted volumes are placed in locations that can be attached by the virtual machines.

Returning to the elements of FIG. 1, virtual environments 101-103 may each include one or more host computing devices and hypervisors to provide resources to virtual machines 111-113. These host computing devices may include communication interfaces, network interfaces, processing systems, computer systems, microprocessors, storage systems, storage media, or some other processing devices or software systems, and can be distributed among multiple devices. Further, virtual machines 111-113 can include virtual representations of physical elements of the host computing systems, and may further include an operating system and various applications. As illustrated in FIG. 1, virtual machines 111-113 may communicate with application volume storage elements 121-123 to attach various application volumes, and make the corresponding applications available in the virtual machines without installation.

Application volume storage 121-123 may include various storage media and controllers capable of communicating data with virtual machines 111-113. The storage media for application volume storage 121-123 may include hard disk drives, flash based memory, data storage circuitry, or some other memory apparatus—including combinations thereof. In particular, application volume storage 121-123 stores application volumes provisioned by provisioning manager 131 for attachment to the various virtual machines. Although illustrated separate in FIG. 1, it should be understood that application volume storage 121-123 might be located within virtual environments 101-103 in some examples.

Provisioning manager 131 may include communication interfaces, network interfaces, processing systems, computer systems, microprocessors, storage systems, storage media, or some other processing devices or software systems, and can be distributed among multiple devices. In particular, provisioning manager 131 may identify an application for provisioning across application volume storage 121-123, and responsively provision the plurality of application volumes using the necessary volume formats. In some instances, provisioning manager 131 may comprise a virtual machine that executes using a hypervisor and host computing system. Accordingly, provisioning manager 131 may generate a native volume first, and then duplicate the necessary application elements to non-native volumes to be dispersed amongst the application volume storage.

Communication links 141-146 use metal, glass, air, space, or some other material as the transport media. Communication links 141-146 could use various communication protocols, such as Time Division Multiplex (TDM), Internet Protocol (IP), Ethernet, communication signaling, a wireless communication format, such as Wireless Fidelity (WIFI), or some other communication format—including combinations thereof. Communication links 141-146 could be direct links or may include intermediate networks, systems, or devices.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus to provision application volumes for attachment to virtual machines, the apparatus comprising:
   one or more non-transitory computer readable media; and
   processing instructions stored on the one or more non-transitory computer readable media that, when executed by processing circuitry, direct the processing circuitry to:

provision an application in a first virtual volume of a first virtual drive format;
identify one or more alternative virtual drive formats for the application;
duplicate the application in the virtual volume to one or more additional virtual volumes corresponding to the one or more alternative virtual drive formats; and
store the virtual volume and each of the one or more additional virtual volumes in separate storage locations, wherein each of the storage locations is accessible by a different set of virtual machines associated with a particular virtual drive format.

2. The apparatus of claim 1 wherein the processing instructions to identify the one or more alternative virtual drive formats for the application direct the processing circuitry to receive user input to identify the one or more alternative virtual drive formats for the application.

3. The apparatus of claim 1 wherein the processing instructions to provision the application in the virtual volume of the first virtual drive format direct the processing circuitry to, in a provisioning virtual machine, provision the application in the virtual volume using a native virtual drive format to the provisioning virtual machine.

4. The apparatus of claim 1 wherein the first virtual drive format comprises virtual hard disk (VHD) format, and wherein the one or more alternative virtual drive formats comprise at least virtual machine disk (VMDK) format.

5. The apparatus of claim 1 wherein the first virtual drive format comprises virtual machine disk (VMDK) format, and wherein the one or more alternative virtual drive formats comprise at least virtual hard disk (VHD) format.

6. The apparatus of claim 1 wherein the apparatus further comprises the processing circuitry.

7. The apparatus of claim 1 wherein each virtual volume from the first virtual volume and the one or more additional virtual volumes is configured to be mounted to a corresponding virtual machine in the different sets of virtual machines, and wherein the corresponding virtual machine is configured to edit registry keys to make the application executable from the mounted virtual volume.

8. A method of provisioning application volumes for attachment to virtual machines, the method comprising:
provisioning an application in a virtual volume of a first virtual drive format;
identifying one or more alternative virtual drive formats for the application; and
duplicating the application in the virtual volume to one or more additional virtual volumes corresponding to the one or more alternative virtual drive formats; and
storing the virtual volume and each of the one or more additional virtual volumes in separate storage locations, wherein each of the storage locations is accessible by a different set of virtual machines associated with a particular virtual drive format.

9. The method of claim 8 wherein identifying the one or more alternative virtual drive formats for the application comprises receiving user input to identify the one or more alternative virtual drive formats for the application.

10. The method of claim 8 wherein the first virtual drive format comprises virtual hard disk (VHD) format, and wherein the one or more alternative virtual drive formats comprise at least virtual machine disk (VMDK) format.

11. The method of claim 8 wherein the first virtual drive format comprises virtual machine disk (VMDK) format, and wherein the one or more alternative virtual drive formats comprise at least virtual hard disk (VHD) format.

12. The method of claim 8 wherein provisioning the application in the virtual volume of the first virtual drive format comprises, in a provisioning virtual machine, provisioning the application in the virtual volume using a native virtual drive format to the provisioning virtual machine.

13. The method of claim 8 wherein each virtual volume from the first virtual volume and the one or more additional virtual volumes is configured to be mounted to a corresponding virtual machine in the different sets of virtual machines, and wherein the corresponding virtual machine is configured to edit registry keys to make the application executable from the mounted virtual volume.

14. A system to provision application volumes for attachment to virtual machines, the system comprising:
a plurality of storage repositories;
a provisioning manager configured to;
provision an application in a virtual volume of a first virtual drive format;
identify one or more alternative virtual drive formats for the application;
duplicate the application in the virtual volume to one or more additional volumes corresponding to the one or more alternative virtual drive formats; and
store the virtual volume and each of the one or more additional virtual volumes separately in the plurality of storage repositories, wherein each storage repository in the plurality of storage repositories is accessible by a different set of virtual machines associated with a particular virtual drive format.

15. The system of claim 14 wherein the provisioning manager configured to identify the one or more alternative virtual drive formats for the application is configured to receive user input to identify the one or more alternative virtual drive formats for the application.

16. The system of claim 14 wherein the provisioning manager configured to provision the application in the virtual volume of the first virtual drive format is configured to provision the application in the virtual volume using a native virtual drive format to the provision manager.

17. The system of claim 16 wherein the native virtual drive format comprises virtual hard disk (VHD) format, and wherein the one or more alternative virtual drive formats comprises at least virtual machine disk (VMDK) format.

18. The system of claim 16 wherein the native virtual drive format comprises virtual machine disk (VMDK) format, and wherein the one or more alternative virtual drive formats comprises at least virtual hard disk (VHD) format.

19. The system of claim 14 wherein each virtual volume from the first virtual volume and the one or more additional virtual volumes is configured to be mounted to a corresponding virtual machine in the different sets of virtual machines, and wherein the corresponding virtual machine is configured to edit registry keys to make the application executable from the mounted virtual volume.

20. The system of claim 14 wherein each of the different sets of virtual machines is executed by a different type of hypervisor.

* * * * *